United States Patent [19]

Perreaut et al.

[11] Patent Number: 5,382,888
[45] Date of Patent: Jan. 17, 1995

[54] FOCUSING DEVICE WITH TWO DYNAMIC WINDINGS FOR ENERGY RECOVERY

[75] Inventors: Jean M. Perreaut, Dijon; Bruno F. Roussel, Genlis, both of France

[73] Assignee: Thomson Tubes & Displays, S.A., Paris, France

[21] Appl. No.: 154,382

[22] Filed: Nov. 18, 1993

Related U.S. Application Data

[63] Continuation of Ser. No. 1,105, Jan. 6, 1993, abandoned.

[30] Foreign Application Priority Data

Jan. 10, 1992 [EP] European Pat. Off. ........ 92400068.0

[51] Int. Cl.⁶ .......................... G09G 1/04; H01J 29/58
[52] U.S. Cl. ........................ 315/382; 315/406
[58] Field of Search ............ 315/382, 406, 399, 408; 335/210

[56] References Cited

U.S. PATENT DOCUMENTS

| | | | |
|---|---|---|---|
| 3,889,156 | 6/1975 | Arya | 315/408 |
| 4,758,762 | 7/1988 | Van Gorkum et al. | 313/440 |
| 4,912,405 | 3/1990 | Richardson | 250/396 ML |
| 5,038,045 | 8/1991 | Rouberol et al. | 250/396 ML |
| 5,118,999 | 6/1992 | Jackson et al. | 315/382 |

FOREIGN PATENT DOCUMENTS 0249294 12/1987 European Pat. Off. .
2085698 4/1982 United Kingdom .

*Primary Examiner*—Gregory C. Issing
*Attorney, Agent, or Firm*—Joseph S. Tripoli; Joseph J. Laks; Harvey D. Fried

[57] ABSTRACT

An electron beam focusing device is provided for apparatus such as cathode ray tubes wherein an electron beam is scanned on a flat surface normal to the beam and converged at a point on the flat surface using magnetic fields. The focusing device includes a static field generator for converging the beam, and a dynamic focus device. The dynamic focus device is comprises a first winding coupled to a power supply, for example a current supply, for providing a magnetic field substantially defining a parabola during a trace interval of the beam to account for the variation in beam path length which occurs with scanning, and a second winding magnetically coupled to the first winding. An energy storing circuit coupled to the first and second windings stores energy during the trace interval and releases energy during the retrace interval such that the second winding induces a reverse current in the first winding, thereby returning current to the power supply during retrace. A thyristor switch references energy induced in the first winding by the second winding to ground during the retrace intervals.

16 Claims, 3 Drawing Sheets

FOCUSING DEVICE WITH TWO DYNAMIC WINDINGS FOR ENERGY RECOVERY

This is a continuation of application Ser. No. 08/001,105 filed Jan. 6, 1993 now abandoned.

BACKGROUND OF THE INVENTION

The invention relates to focusing devices applying a magnetic field to the electron beam of a scanning beam apparatus such as a cathode ray tube, for focusing the beam at a point on a screen or other surface oriented normal to the beam.

Electrons emitted from the cathode of a CRT are accelerated toward the screen, but tend to diverge as they travel due to electrostatic repulsion between the electrons. The electrons can be forced into a tight beam using magnetic fields. Typically, means producing a steady state or static magnetic field and means producing a varying or dynamic magnetic field are superimposed for focusing. The dynamic portion of the field varies as a function of the scanning position of the beam on the screen or other surface on which the beam is incident.

The focusing coils of a scanning electron beam apparatus form a magnetic lens having a focal length. However, the screen or other display device is substantially planar rather than spherical, and as a result the distance between the focusing device and the point at which the beam is incident on the planar display device varies as a function of vertical and horizontal position of the scanning beam. The distance is greater at the edges of the screen and less in the center. In order to accommodate the difference in beam path length (i.e., to converge the beam at a point as the beam scans through areas of varying path length), the dynamic focusing coils are driven with a current signal which is shaped as a parabola at the scanning rate of the main deflection circuits.

The dynamic focusing current signal adds to or subtracts from the magnetic field applied by the static field generator, which may comprise permanent magnets or a coil carrying a steady state direct current. In a device wherein the static and dynamic signals are applied to the same coil, the steady state and time varying currents can be summed.

The dynamic portion of the focusing deflection is such that the level of the focusing deflection field due to the sum of the static (e.g., permanent magnet) field and the dynamic parabola is at a maximum when the beam is directed at the center of the screen (corresponding to a shorter focal length) and at a minimum when the beam is directed at the edges of the screen (corresponding to a longer focal length). The beam converges at a point on the screen or other display apparatus regardless of the X-Y position at which the beam is incident while scanning.

The dynamic part of the focusing device is generally controlled by a current-controlled amplifier, i.e., an amplifier which produces a parabolic current through a focusing coil coupled to the output of the amplifier in response to an input at the scanning frequency. The input is typically coupled to a parabola voltage generated synchronously with the flyback pulse which resets the main deflection circuits after a horizontal scan. Current-controlled amplifiers, however, dissipate a great deal of power.

SUMMARY OF THE INVENTION

It is an aspect of the invention to reduce the power dissipation of a focusing deflection device by using a resonant circuit to store a portion of the energy developed by a focusing deflection circuit and to return the stored energy to the power supply.

It is another aspect of the invention to provide two coils in a focusing device rather than one, the two coils being coupled such that one of the coils (the focusing coil) produces a field for converging the electron beam during the trace interval of the beam, and the other of the coils couples stored energy to the focusing coil during the retrace interval, such that current is returned to the power supply.

It is a further aspect of the invention to superimpose two coils in a focusing circuit such that the coils are optimally coupled for providing the necessary focusing deflection field and returning a substantial portion of the energy developed by the focusing circuit to the power supply driving the deflection circuit.

These and other aspects of the invention are found in a focusing device which is provided with two coupled windings in the dynamic focusing portion of the focusing device, rather than a single winding. One of the windings of the dynamic circuit is an active deflection winding and produces the magnetic deflection field which converges the electrons in the beam during the trace interval of scanning. Another winding of the dynamic circuit is coupled to the active deflection winding for returning a portion of the energy developed in the dynamic focusing circuit to the power supply. Whereas energy that would otherwise be dissipated is returned to the power supply, the invention produces the required focusing deflection with substantially decreased power supply loading.

More particularly, these and other aspects of the invention are found in an electron beam focusing device for apparatus such as cathode ray tubes wherein an electron beam is scanned on a flat surface normal to the beam and converged at a point on the flat surface using magnetic fields. The focusing device includes a static field generator for converging the beam, and a dynamic focus device. The dynamic focus device has a first winding coupled to a current supply for providing a magnetic field substantially defining a parabola during a trace interval of the beam to account for the variation in beam path length which occurs with scanning, and a second winding magnetically coupled to the first winding. A resonant circuit coupled to the first winding and to the second winding stores energy during the trace interval and releases energy during the retrace interval such that the second winding induces a reverse current in the first winding, thereby returning current to the power supply during retrace. The static field generator and the first and second windings are mounted axially adjacent or overlapped along the beam axis. The static field generator can be a permanent magnet and the first and second windings can be superimposed at the axial center of the static field of the magnet. Alternatively, the static field generator can have a winding in a magnetically permeable shield structure with a gap for concentrating the static field at an axial end of the focusing device, the first and second windings being superimposed on one another adjacent the gap and outside the shield.

DETAILED DESCRIPTION OF THE PREFERRED EMBODIMENTS

The invention is useful with any type of focusing device, whether or not the device includes permanent magnets. For the dynamic part of the focusing deflection, two windings are coupled such that the one winding accomplishes focusing deflection and the other winding is provided as a part of a resonant circuit which stores energy during the deflection part of a scanning cycle and couples the stored energy to the focusing deflection winding during retrace for returning energy to the power supply. The circuit thus requires a special winding arrangement.

The focusing circuit of the invention includes two windings which are arranged such that they are magnetically coupled. The two coupled windings (L1 and L2 in FIG. 1) permit recovery of the energy stored in a capacitor C1 during the forward or trace portion of a scanning cycle. The ratio of the inductances of the two coupled coils is according to the following relationship, where the times Ta and $\tau$ represent the trace and retrace times, respectively:

$$\frac{L_1}{L_2} = \left( \frac{Ta}{\tau} - 1 \right)^2$$

Using a circuit according to this relationship the power dissipated in the focusing device can be reduced relative to the power dissipated by a current amplifier circuit by a factor of ten.

Figure 2:
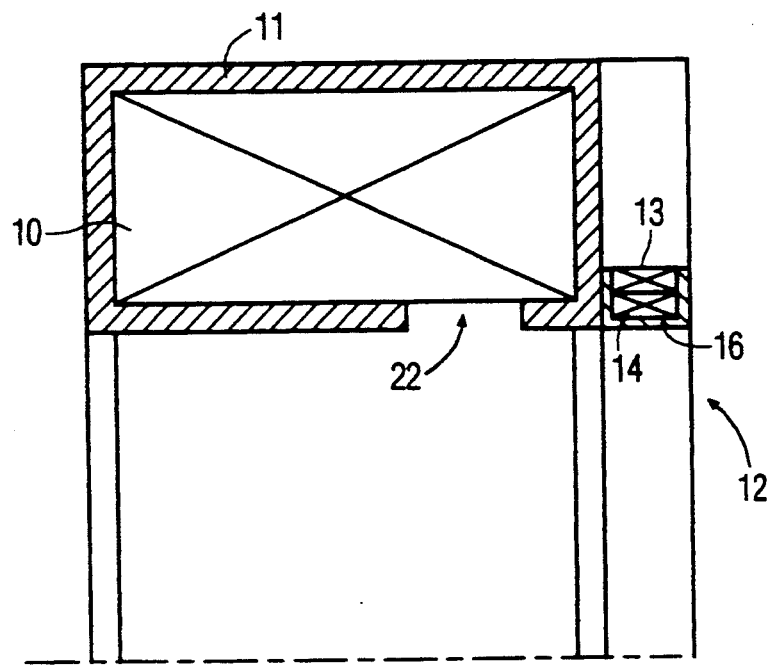
FIG. 2 is a partial cross section through a focusing coil device including coils L1 and L2 in FIG. 1, and showing a cross section of the focusing coil on one side of the axis of the electron beam.

According to a first embodiment of the invention as shown in FIG. 2, the invention can be applied to a classic focusing device comprising a static winding 10 mounted in a shield 11 of extra soft (high permeability) iron. The shield encloses the static winding but for a gap 22 which is disposed near one axial side of the focusing device. The shield 11 concentrates the magnetic flux lines of the static field to an axially short length relative to the beam path because the high permeability of the shield confines the flux lines to the shield material except at the gap 22. The static coil and shield structure thus constitute a magnetic focusing lens which is thin in the axial direction along the beam path.

The dynamic focusing device 12 is placed on the exterior of the shield 11 so as to avoid coupling between the static and the dynamic fields. The dynamic focusing device 12 includes the two coupled coil windings 13, 14 (L1 and L2) discussed above, one being wound over the other and the two being housed in a coil frame 16. The dynamic focusing device 12 is disposed on the same axial side of the shield and static winding as the gap, thereby placing the center or maximum point of the dynamic focusing device close to the center of the static focusing device.

Figure 3:
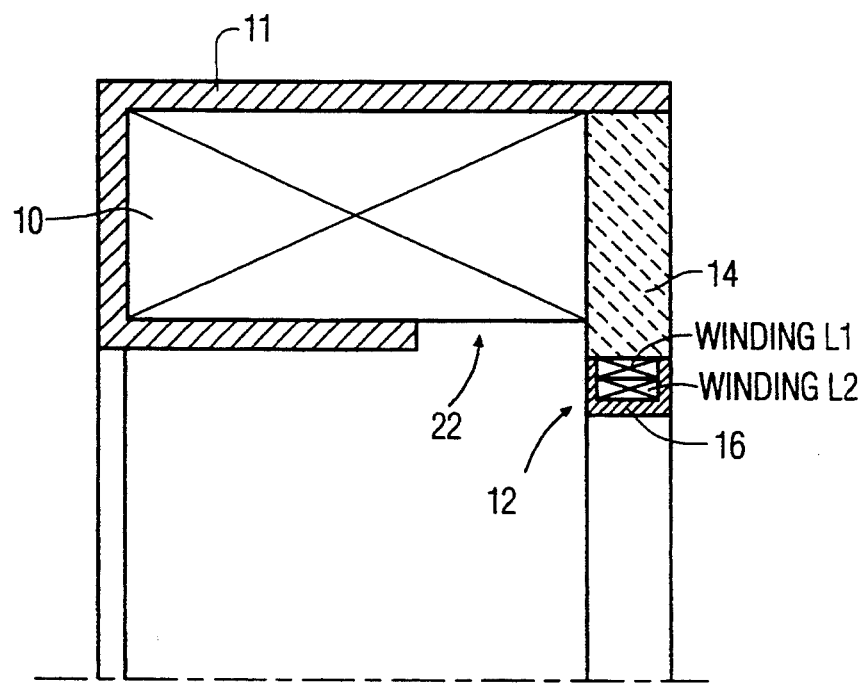
FIG. 3 is a partial cross section corresponding to FIG. 2, showing an alternative embodiment of the invention.
Figure 4:
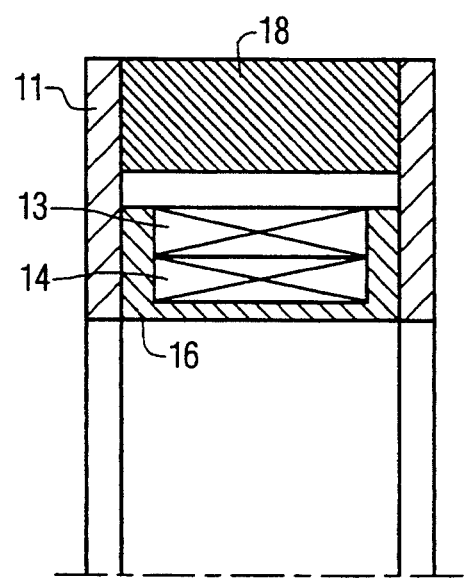
FIG. 4 is a partial cross section corresponding to FIG. 2, showing a further alternative embodiment; and, FIG. 5 is a schematic diagram illustrating a preferred embodiment of the invention wherein a static magnetic field generator and dynamic vertical and horizontal field generators are combined.

FIGS. 3 and 4 illustrate alternative preferred structures for the focusing device, in each case including means for generating a static magnetic field and the two coupled coils of the dynamic focus coil that provide the adjustment of the focusing field as a whole for accommodating the difference in focal length as a function of scanning displacement of the beam, and also store and return to the power supply a portion of the energy used in generating the focusing field. Corresponding reference numerals are used in the respective figures to identify corresponding elements.

In the alternative embodiment of FIG. 3, the static coil winding 10 is also enclosed in a shield 11 of high permeability material and the structure defines a gap 22 at which the static field is centered due to radiation of the magnetic flux lines from the magnetically permeable material adjacent the gap. In this embodiment the shield 11 does not fully enclose the winding except for the gap. A ferrite ring 15 is provided on the same axial side of the static winding 11 as the gap, relative to the beam path. The focusing and coupled energy return coils L1, L2 are disposed under the ferrite ring, and enclosed in a casing 16. This arrangement places the centers of the static and dynamic field generating means axially very close to one another with respect to the beam path.

According to the embodiment of FIG. 4, the means generating the static field and the two coupled coils of the dynamic focusing device are axially overlapped relative to the beam path such that their maximum points along the axis of the electron beam coincide. Although it would be possible to generate the static field with a winding carrying a direct current, it is preferred that the static field according to this embodiment be generated by permanent magnet material 18, thereby precluding any problems associated with coupling between the static and dynamic field generation means.

By superimposing the permanent magnet static field and the two coils of the dynamic focusing device, maximum efficiency is obtained in the dynamic circuits. Furthermore, this arrangement permits the dynamic focusing device to be further excited with a static focusing current for adjusting the level of the static field, using the same winding which produces the dynamic focusing field.

Figure 5:
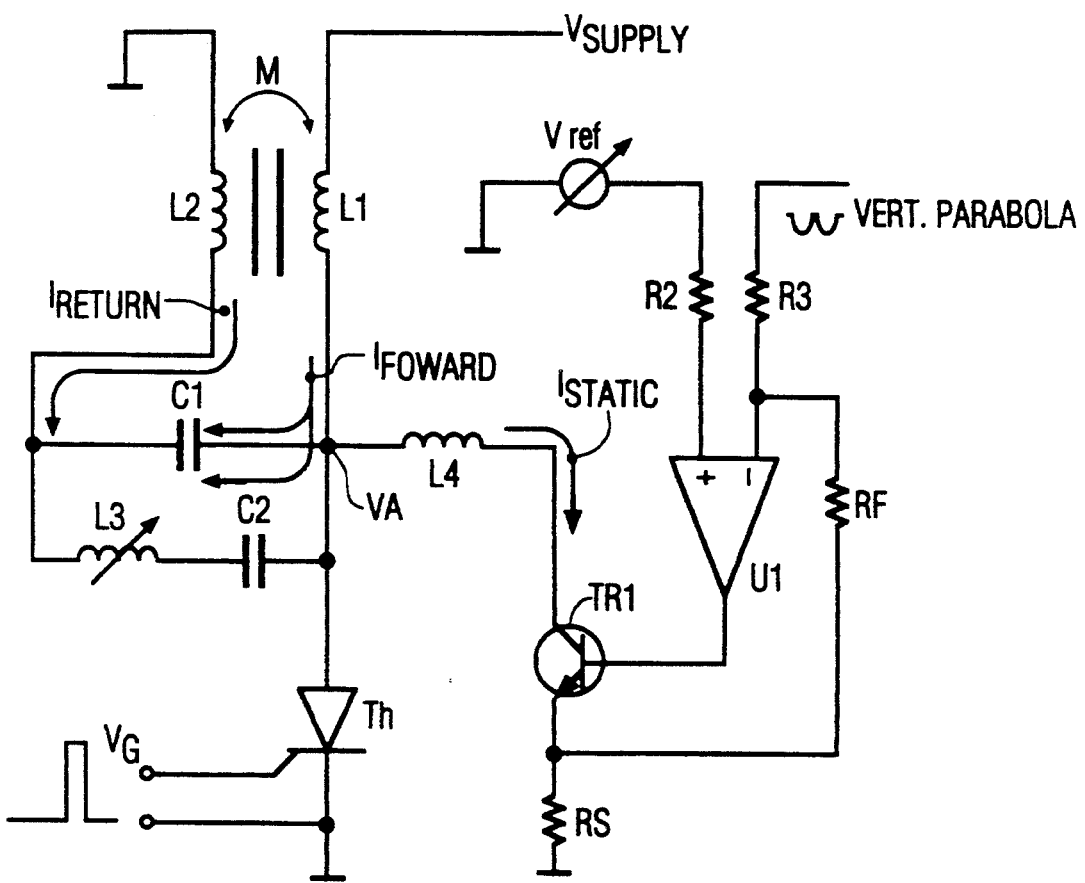

A circuit operable for superimposing a static current for adjusting the focus field is shown in FIG. 5. According to this embodiment the current amplifier which produces the adjustment current can also be arranged to provide a focus correction parabola operating at the vertical rate of the raster.

Figure 1:
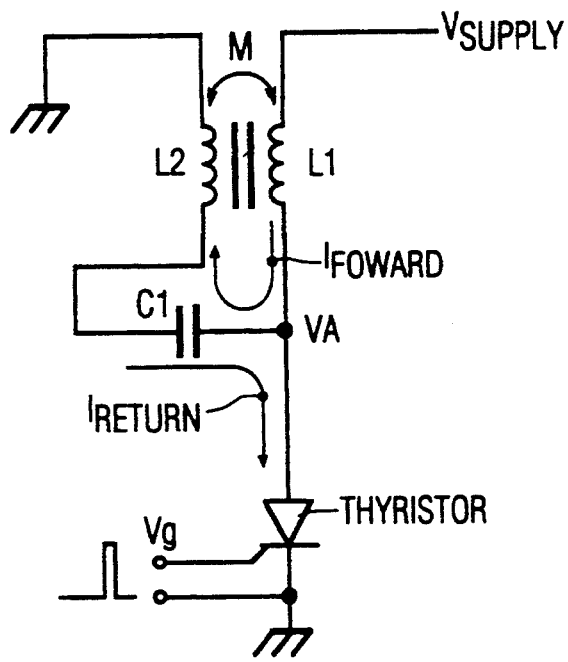
FIG. 1 is a schematic diagram illustrating a focusing device according to the invention.

The circuits of FIGS. 1 and 5 are in each case tuned to the line scan half-frequency, with recovery of energy during the horizontal retrace interval. This is accomplished by use of at least two coupled induction coils L1 and L2. Induction coil L1 is in fact the dynamic focusing winding in which a parabolic current must flow during the trace interval of the scan, for adjusting the focal length of the magnetic lens provided by the focusing device as a function of scanning position of the beam.

The supply voltage $V_{SUPPLY}$ is constant, for example 15 VDC and at a typical current drain of about 230 mA, or about 3.5 W power dissipation. Coil L1 is coupled between the supply voltage and the anode of a thyristor Th, whose a cathode coupled to ground. The gate input of the thyristor Th is coupled to the flyback pulse $V_G$, for initiating conduction of thyristor Th upon entry into the retrace interval. Referring to FIG. 1, the thyristor coupled between coil L1 and ground does not conduct during the trace interval. During the trace interval, current $I_{FORWARD}$ from the power supply is coupled to ground through inductor L1, capacitor C1 and inductor L2. A sinusoidal current is provided in inductor L1, and capacitor C1 becomes charged (more positive on its terminal coupled to point VA). The circuit is tuned such that the current in inductor L1 reaches a minimum at the end of the scan interval. The flyback pulse from the horizontal deflection circuits initiates conduction of thyristor Th at gate input $V_G$ at the beginning of retrace. The thyristor essentially grounds point VA, and begins to conduct current $I_{RETURN}$, from the capacitor C1 and inductor L2.

The energy stored in capacitor C1 during the trace interval drives a reverse current during retrace. Whereas induction coils L1 and L2 are coupled, and the current produced during retrace in coil L2 is in the direction of $I_{RETURN}$, stored energy is transferred to coil L1. Coil L1 now conducts in the opposite direction, i.e., returning to the power supply the stored energy accumulated in the resonant circuit during the trace interval.

Thyristor Th continues to conduct after triggering so long as charge remains to be drained, i.e., until current flow ceases. When current through thyristor Th ceases, also tuned to occur at the end of the retrace interval, all the available stored energy has been extracted. Thyristor Th then becomes reverse biased because capacitor C1 has been charged in the opposite direction by current $I_{RETURN}$. With cutoff of thyristor Th the voltage at point VA drops to a negative peak. The cycle begins again with current in coil L1 varying sinusoidally over the trace interval. The current in the thyristor is related to the number of turns of the respective coils, according to the relationship:

$$I_{Th} = I_{L1} \times \frac{n1}{n2}$$

where n1 is the number of turns of L1 and n2 is the number of turns of L2.

The ratio of the values for the two windings L1 and L2 is a function of the scan characteristics. Furthermore, the values for the sum of inductances of coils L1 and L2 and the capacitance of capacitor C1 are defined with reference to the forward scan time and the values for coil L2 and C1 are determined by the retrace time of the scanning system.

During trace, coils L1 and L2 are effectively in series. Assuming that the coupling between coils L1 and L2 is perfect, the inductance can be calculated from the required timing relationship.

$$L = L_1 + L_2 + 2\sqrt{L_1 L_2}$$

$$Ta = \pi\sqrt{LC_1} = \pi\sqrt{(L_1 + L_2 + 2\sqrt{L_1 L_2})C_1}$$

$$Ta = \pi\sqrt{(L_1 + L_2)^2 C_1} \text{ or } \frac{Ta}{\pi\sqrt{C_1}} = \sqrt{L_1} + \sqrt{L_2}$$

During retrace, coil L2 and capacitor C1 form the timing circuit. Therefore the following relationships apply for correlating the retrace time $\tau$ with the respective values of inductance and capacitance:

$$\tau = \pi\sqrt{L_2 C_1} \text{ or } \frac{\tau}{\pi\sqrt{C_1}} = \sqrt{L_2}$$

Hence, we obtain:

$$\frac{L_1}{L_2} = \left(\frac{Ta}{\tau} - 1\right)^2$$

Any system using the arrangement described hereinabove will necessarily be governed by this formula.

Adjustment of the amplitude of the dynamic current is done by varying the level of the supply voltage, which must be kept stable in order to avoid focus drift. Thermal drift due to variation in the resistance of the windings is negligible.

In FIG. 5, a further tuned circuit comprising capacitor C2 and adjustable inductor L3 are arranged in parallel with capacitor C1. This circuit adjusts the sinusoidal shape of the current in the focusing inductor L1 to more nearly approximate a parabola. The maximum current of the parabola applied to the dynamic focus coil occurs at the center of the screen, which is considered the origin (the current therefore being a cosine function). For applications which require higher precision, the cosine provided by the tuned circuit of L1, C1 and L2 can be modified by summing a second cosine function according to the relationship:

$$k\theta^2 = \cos(\theta) - \left(\frac{3}{2} - \sqrt{2}\right)\cos(2\theta)$$

The resonant circuit formed by capacitor C2 and coil L3 operates at twice the frequency of the circuit defined by coils L1, L2 and capacitor C1. The current flowing in this additional parallel circuit is added to the main current through capacitor C1, for shaping the resulting parabola current in coil L1. Coil L3 permits a precise manual adjustment of the circuit. The voltage across the terminals of inductor L1 then becomes linear, i.e., the differential of the current.

According to FIG. 5, the current in coil L1 is modified further by an additional signal, at a much lower frequency. The current amplifier shown in FIG. 5 sums the additional current $I_{STATIC}$ with the cosine current at capacitor C1 and the cosine current at series connected capacitor C2 and inductor L3. The operational amplifier in the current control amplifier section produces an output current via transistor 20 that is proportional to the voltage signals at its input. The voltage across sensing resistor RS indicates the current level in transistor 20 and is fed back to an input of the amplifier U1 through a feedback path including resistor R2. The respective inputs of amplifier U1 are also coupled via series resistors R3 and R4 to a voltage reference $V_{REF}$, and to a vertical rate parabola signal $P_{VERT}$.

The current control amplifier injects a current parabola at the frame frequency for vertical focus correction and a static current (adjustable by voltage reference $V_{REF}$) which corrects the level of the field produced by the permanent magnets. The inputs of operational amplifier U1 of the amplifier configuration are coupled to a preferably adjustable voltage reference $V_{REF}$ and the vertical voltage parabola signal via series resistors R2, R3. Transistor TR1 couples the output of amplifier U1 to coil L4 and thus to the summing junction VA. Feedback of the current signal sensed by current sense resistor RS is fed back to the input through feedback resistor RF.

The circuit benefits from current control provided by the feedback configuration of the current amplifier while also achieving substantial reduction of power dissipation in the portion of the focusing circuit operating at the line scanning frequency.

What is claimed is:

1. A focusing device for a scanning electron beam, comprising:
   means for producing a static focusing field for converging said beam;
   means for producing a dynamic focusing field for said beam, said dynamic focus means having a first winding coupled to a current supply for providing a dynamic magnetic focus field during trace intervals of said beam and a second winding magnetically coupled to said first winding; and,
   means coupled to said first winding and to said second winding for storing energy during said trace intervals and for releasing energy during retrace intervals, said second winding inducing a reverse current in said first winding for returning current to a power supply during said retrace intervals.

2. The focusing device according to claim 1, wherein said means for producing said static focusing field comprises an annular static field winding and wherein the first and second windings comprise annular windings disposed substantially coaxially with one another.

3. The focusing device according to claim 2, wherein said means for producing said static focusing field is substantially enclosed in a magnetically permeable shield, said shield having a gap opening toward said beam.

4. The focusing device according to claim 3, wherein said first and second windings are mounted adjacent said gap and interiorly of said shield.

5. The focusing device according to claim 1, wherein said means for producing said static focusing field comprises:
   a static field winding;
   a magnetic casing partly surrounding said static field winding;
   a ferrite ring; and,
   first and second dynamic windings disposed inwardly of said ferrite ring and adjacent said static field winding such that said casing and said ferrite ring define a gap.

6. The focusing device according to claim 1, wherein said means for producing said static field comprises a permanent magnet.

7. The focusing device according to claim 6, wherein said first and second windings are superimposed radially on one another and are centered at a point of maximum static field produced by said permanent magnet.

8. The focusing device according to claim 1, wherein said energy storing means coupled to said first winding and second windings comprises a capacitor coupled between said first and second windings 9. The focusing device according claim 8, further comprising a resonant circuit for generating a cosine current in said first winding approximating a parabola current, coupled in parallel with said capacitor and operable to store a portion of said energy developed during said trace intervals of said beam and to return said portion of said energy to said power supply during said retrace intervals.

10. The focusing device of claim 8, wherein said resonant circuit comprises a capacitor and an inductor.

11. The focusing device according claim 1, further comprising:
   a resonant circuit for generating a cosine current in said first winding approximating a parabola current, coupled in parallel with said energy storing means and operable to store a portion of said energy developed during said trace intervals of said beam and to return said portion of said energy to said power supply during said retrace intervals; and,
   a current control means for injecting both a vertical rate current parabola and a static current into said energy storing means and said resonant circuit.

12. The focusing device of claim 1, wherein said first winding is coupled to a current sink for grounding a terminal of said first winding during said retrace intervals.

13. The focusing device of claim 9, further comprising an adjustment circuit coupled in parallel with at least one of said first winding and said resonant circuit for modifying said cosine current.

14. The focusing device of claim 1, further comprising means for referencing said energy induced in said first winding by said second winding to ground during said retrace intervals.

15. The focusing device of claim 14, wherein said referencing means comprises a thyristor switch.

16. A focusing device for a scanning electron beam, comprising:
   means for producing a static focusing field for converging said beam;
   means for producing a dynamic focusing field for said beam, said dynamic focus means having a first winding coupled to a current supply for providing a dynamic magnetic focus field during trace intervals of said beam and a second winding magnetically coupled to said first winding;
   means coupled to said first winding and to said second winding for storing energy during said trace intervals and for releasing energy during retrace intervals, said second winding inducing a reverse current in said first winding for returning current to a power supply during said retrace intervals;
   switch means for referencing said energy induced in said first winding by said second winding to ground during said retrace intervals;
   resonant means for generating a cosine current in said first winding approximating a parabola current, coupled in parallel with said energy storing means and operable to store a portion of said energy developed during said trace intervals of said beam and to return said portion of said energy to said power supply during said retrace intervals; and,
   current control means for injecting both a vertical rate current parabola and a static current into said energy storing means and said resonant means.

* * * * *